Patented Nov. 20, 1951

2,575,413

UNITED STATES PATENT OFFICE 2,575,413

SOLDERING FLUX

William Benjamin Franklin, San Fernando, Calif., assignor to Joseph J. White, Los Angeles, Calif.

No Drawing. Application October 17, 1949, Serial No. 121,888

2 Claims. (Cl. 148—25)

The object of my invention is an improved composition of flux for use with soft solder. This flux is especially useful for coating the outside of thin solder in ribbon or sheet form. The outstanding advantages of this flux over other fluxes known to the inventor are its flexibility without cracking off, its high melting point, non-corrosive and non-poisonous characteristics.

It is well known that much time is saved in soldering where thin ribbon or sheet solder can be wound about a wire or placed between the metal parts to be connected with solder. One reason that so much time and solder can be saved is that a pre-determined amount of solder can be used so that after the heat is applied, the resulting connection is neat without any excess of solder to dress away. The disadvantage of this operation is the application of the flux to the solder or the metal parts to be connected, and this disadvantage is completely overcome by the use of my novel soldering flux. The usual flux used for this work is either a paste flux, containing corrosive and poisonous chemicals in water and suspended in petroleum jelly; or rosin dissolved in alcohol. The application of either the rosin or paste is messy. It is also difficult to clean away the excess after the connection is made. It is obvious that if a ribbon of solder were coated with the petroleum jelly flux in advance of use, the flux would come off on your hands when handled, and the ribbon would stick together. Prefabricated washers, or parts punched from a ribbon or sheet of solder coated with this paste, would be difficult to pack or handle as part of the flux would rub off. If rosin were used in the above procedure it would crack off in cold weather when wound or bent about the metal parts to be soldered.

An object of the present invention is to provide a flexible flux with a melting point above the usual summer temperatures of 110° F. that is non-poisonous, non-corrosive, and which can be coated on the outside of ribbon or sheet solder many months in advance of its use.

Another object of this invention is a composition of flux, which when coated on the outside of a ribbon of solder, can be wrapped around a piece of cardboard and packed in an envelope for storage or shipment without an excessive amount of the flux sticking to the card or envelope and which will not readily crack or chip off of the solder.

A further object of this invention is a flux, that when pre-coated on the surfaces of tin-lead solder, in thin ribbon form, can be handled by a workman with ease and dispatch, eliminating the operation of first applying flux and providing a flux composition that can be easily removed from the work after the soldering operation.

Another object of this invention is a flux that does not require moisture to perform satisfactorily. Some fluxes, particularly paste fluxes, require water in the mixture, or hygroscopic chemicals to draw moisture from the air.

My flux composition consists of a mixture of rosin, a fatty acid and high melting point petroleum wax. The fatty acid can be stearic acid, palmitic acid or any similar material not too corrosive. The petroleum wax is best if it has a melting point of 195° to 200° F. However, a melting point of 160° F. could be used.

In preparing the composition, I prefer to use the ingredients in about the following proportions, 100 pounds of rosin, 100 pounds of stearic acid, and 40 pounds of high melting point wax. These materials are melted and mixed together while hot at a temperature not exceeding 212° F. The proportions of this formula can, of course, be varied and different proportions are most desirable for the soldering of certain types of metals and for certain soldering operations. A thin coating of the composition can be applied to ribbon or sheet solder while the flux is hot, or the composition can be allowed to cool and then dissolved in a solvent common to all three ingredients and applied cold. Subsequent evaporation removes the solvent and leaves a thin even coating on the solder.

Having fully described the above invention and preparation of my compound, I claim:

1. A substantially water-free, flexible, non-corrosive, non-hygroscopic flux for pre-coating sheet or ribbon solder, consisting essentially of the product formed by melting together a mixture of about 1 part rosin, about 1 part of a higher fatty acid, and about 0.4 part of a wax having a melting point of about 160° F. to 200° F.

2. A substantially water-free, flexible, non-corrosive, non-hygroscopic flux for pre-coating sheet or ribbon solder consisting essentially of the product formed by melting together a mixture of about 1 part rosin, about 1 part stearic acid, and about 0.4 part of a wax having a melting point of about 195° F. to 200° F.

WILLIAM BENJAMIN FRANKLIN.

REFERENCES CITED

The following references are of record in the file of this patent:

UNITED STATES PATENTS

| Number | Name | Date |
|---|---|---|
| 185,339 | Mackey | Dec. 12, 1876 |
| 845,948 | Hall | Mar. 5, 1907 |
| 1,882,567 | Saukaitis | Oct. 11, 1932 |
| 2,471,451 | Rinkenbach et al. | May 31, 1949 |

FOREIGN PATENTS

| Number | Country | Date |
|---|---|---|
| 11,605 | Great Britain | Sept. 17, 1908 |
| 194,729 | Great Britain | May 22, 1924 |